DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 5, 1974

928 O.G. 6

T928,002

PROCESS FOR PRODUCING CRYSTALLINE ANHYDROUS SODIUM CARBONATE

David R. Delling, Green River, Wyo., and James V. Wiseman, Lafayette, Calif., assignors to Stauffer Chemical Company, New York, N.Y.

Filed June 8, 1973, Ser. No. 368,404
Int. Cl. B01d *9/02;* C01d *7/00*
U.S. Cl. 23—302
No Drawing. 16 Pages Specification

A process for producing crystalline anhydrous sodium carbonate having a very high bulk density up to 95 lbs./ft.$^3$ by crystallizing anhydrous sodium carbonate from a crystallizer source material of a solution of sodium carbonate or a slurry of less than 50 percent by weight of sodium carbonate monohydrate in an aqueous solution of sodium carbonate by heating at a temperature above 228° F. in the presence of sufficient $Ca^{++}$ so that $Ca^{++}$ is found in the crystallized anhydrous sodium carbonate, preferably about 25 to 400 p.p.m. $Ca^{++}$ (as calcium on a soda ash basis), including a process for the producing crystalline anhydrous sodium carbonate by converting the sodium carbonate monohydrate of a slurry of less than 50 percent by weight of, sodium carbonate monohydrate in an aqueous solution of sodium carbonate by heating at a temperature above 228° F., and (2) then separating the crystals of anhydrous sodium carbonate from the crystallizer source material preferably while they are at a concentration of less than 50 percent by weight.